Jan. 6, 1970  E. SZIGETI  3,487,894
SEQUENTIALLY OPERATED BRAKE SYSTEM
Filed May 17, 1967  2 Sheets-Sheet 2
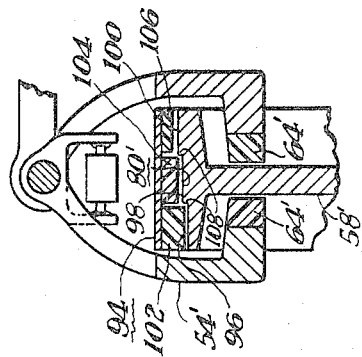
Fig. 7.
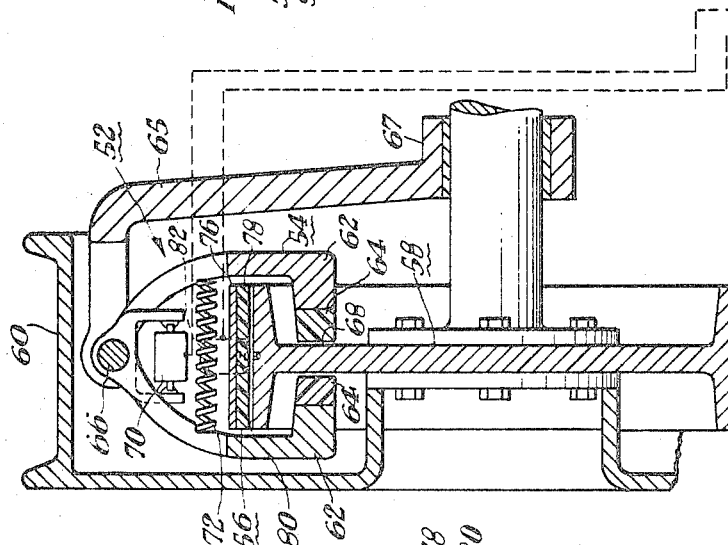
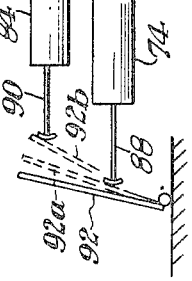
Fig. 6.
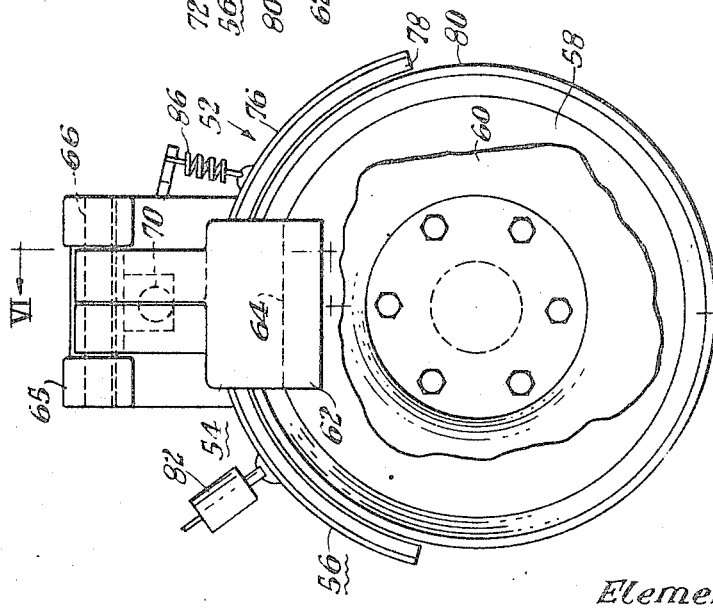
Fig. 5.
INVENTOR.
Elemer Szigeti.
BY
HIS ATTORNEYS

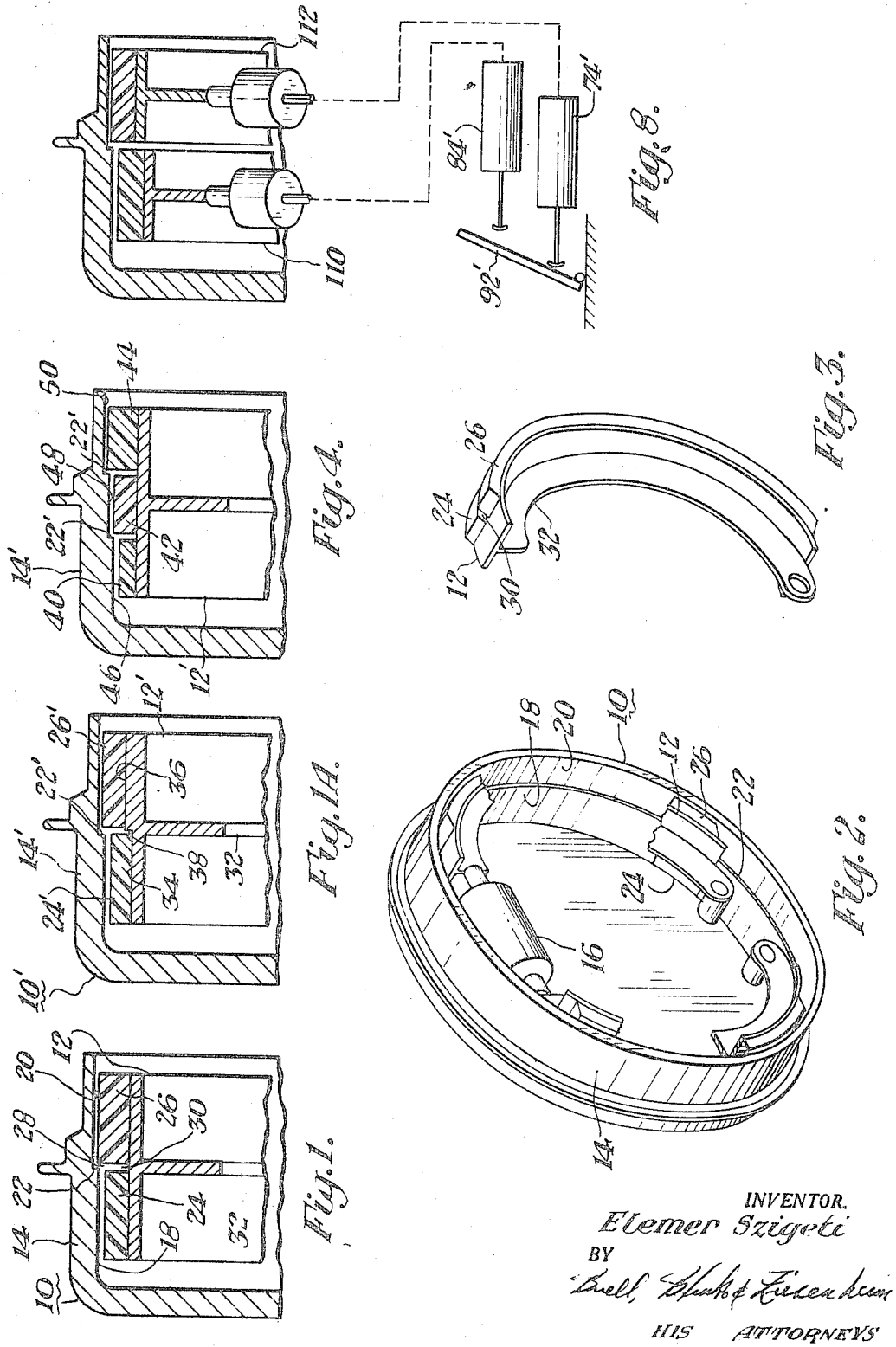

United States Patent Office 3,487,894
Patented Jan. 6, 1970

3,487,894
SEQUENTIALLY OPERATED BRAKE SYSTEM
Elemer Szigeti, 91 Promenade des Anglais,
Nice, France
Filed May 17, 1967, Ser. No. 639,200
Int. Cl. F16d *63/00, 51/00, 65/32*
U.S. Cl. 188—70       3 Claims

ABSTRACT OF THE DISCLOSURE

An automatically sequential brake system including a stepped brake drum or disc and a stepped brake shoe of suitable configuration wherein the steps of the drum or disc are disposed at relative heights which differ from the relative heights of the brake linings. The brake system is largely self-cooled. The brake lining portions are fabricated from lining materials of differing resiliencies so that the linings engage the drum or disc in a stepwise fashion with the more resilient lining engaging first. Increased pressure on the brake shoe deforms the more resilient lining to permit one or more successive linings to engage the brake drum or disc for successively greater braking action. Another form of sequential brake system includes a combination of disc and drum type brakes. A dual hydraulic system is coupled to the drum and/or disc brake shoes. Initial depression of the brake pedal actuates one of the drum and/or disc brakes, while further depression actuates both hydraulic systems to actuate both brakes simultaneously for greater or emergency braking action. One or both of the disc and drum brake shoes can be provided with stepped brake linings for use with a similarly stepped drum and/or disc, respectively, along the lines described above. The stepped linings can be spaced laterally to provide additional heat dissipation.

---

The present invention relates ot novel brake systems for vehicles and the like wherein means are provided for successively energizing elements of the brake system in a stepwise or cumulative fashion. Certain arrangements of the invention enable the elements of the brake to be applied successively upon movement of a single brake shoe, while other arrangements permit the stepwise application of dual brake shoes. Still other arrangements of the invention present a combination of these features.

There are many conventional brake systems for example Patent No. 3,064,763 in which two or more brake shoes or elements are applied simultaneously or wherein the application of one brake element causes the simultaneous actuation of another brake element for example Patent No. 2,915,145. There are also known systems (Patent No. 2,915,145) wherein a combination of drum and disc brakes are utilized. Invariably, however, the application of either the drum or disc brake causes the simultaneous application of the other dual brake. Thus, conventional brake systems suffer from the disadvantages of rapid wear and overheating, inasmuch as all of the braking surfaces are engaged simultaneously without regard to the extent of braking action required. That is to say, the same amount of braking surface is engaged for light braking action as for emergency stops. In a case of a moving vehicle, the sudden or emergency application of the brakes usually causes the wheels to lock and the vehicle to skid out of control. Skidding in many cases can be avoided by successive applications of discreet braking surfaces which will bring the vehicle to a stop within a shorter distance and without skidding. Although conventional brake systems can be carefully applied to minimize skidding of the vehicle, the normal panic reaction of the human operator under emergency circumstances makes such careful application largely impossible.

Heat is produced in the contact zone and is transmitted to the contacting materials of the brake, such heat in conventional brakes causes a degree of warping. After long-continuous braking the brake drum becomes ovalized which limits the area of contact between the drum and lining and in turn produces a dangerous reduction in braking efficiency. Attempts have been made to dissipate this heat by the use of convecting fins or by means of baffles to induce circulation of air. These attempts however have met with little success. None of the aforementioned patents describes a reliable, sequenced braking system and more particularly one which can be employed with a drum type brake system. Likewise these patents do not disclose a self-cooled brake system.

The use of large continuous braking surfaces in conventional brake systems makes it difficult to dissipate the heat developed by the braking action. As a result, the brake linings become embrittled and the braking action unreliable. The aforementioned dual brake systems of Patents No. 3,064,763 and 2,915,145 reduces this problem to some extent by providing a number of smaller braking surfaces. However, the simultaneous application of these surfaces still results in the application of considerable destructive heat.

I have overcome these problems of the prior art by providing braking systems which are capable of stepwise or successive application. For light braking action only one of the braking elements of my system may be utilized. As the brake pedal or other operating device is further depressed or energized, additional ones of the brake elements are activated. The application of successive braking elements may be slow or rapid depending upon the speed with which the brake pedal is depressed. However, the individual brake elements are always applied in succession to considerably lessen the chances of the vehicle wheels locking and skidding, even in emergency situations. Thus, the rapidity of the stepwise application of the brake elements can be controlled by the operator depending upon how slowly or rapidly he depressed the brake pedal. However, the operator cannot avoid the stepwise application of the brake elements which avoidance would cause the vehicle wheels to lock as in the case of conventional braking systems.

The use of two or more successively applied brake elements facilitate the dissipation of heat therefrom. Moreover, in the lighter brake applications, less than the total brake lining is engaged with the brake drum or disc so that the generation of heat is minimized.

I accomplish these desirable results by providing a sequential frictional brake comprising a braking surface, a braking shoe mounted adjacent said braking surface and movable toward and away from said surface, said braking surface including a number of adjacent surface portions disposed at differing elevations, said brake shoe having a like number of brake lining segments arranged thereon for respectively engaging said braking surface portions, the engaging surfaces of said lining segments being disposed at differing elevations, the differential elevation of said braking surface portions being different than the differential elevations of said lining segments, and means for moving said lining segments sequentially into engagement with their respective braking portion surfaces. In certain applications, said sequential moving means includes means for moving said brake shoe with variable force against said braking surface, and said lining segments being fabricated from materials of respectively differing resiliencies, and at least one of said lining segments is disposed closer to its respective braking surface portion than the remainder of said segments and said closer segment is fabricated from a correspondingly more resilient brake lining material with the remainder of said segments being fabricated from material of progressively less resilience so that the segments are successively engaged with their associated portions in the order of their decreasing resiliencies and are successively and elastically deformed to permit subsequent and successive engagement of the harder brake lining segments.

My invention also is applicable to dual brake systems, for example, a sequential braking system comprising a rotatably mounted disc and drum member, disc brake shoe means mounted for engaging the disc portion of said member, drum brake shoe means mounted for engaging the drum portion of said member, separate energizing circuits coupled to said disc brake means and drum brake means for urging said disc and said drum brake shoe means against their respective braking surfaces, and means for operating said energizing circuits sequentially. In the last-mentioned sequential brake system, either the disc or the drum surfaces can be omitted and a pair or more of suitably shaped brake shoes can be mounted for sequential engagement in the remaining surface.

During the foregoing discussion, various objects, features and advantages of the invention have been set forth. These and other objects, features and advantages together with structural details thereof will be elaborated upon during the forthcoming description of presently preferred embodiments of the invention and presently preferred methods of practicing the same.

In the accompanying drawings, I have shown presently preferred embodiments of the invention and have illustrated presently preferred methods of practicing the same wherein:

FIGURE 1 is a cross-sectional view of one form of sequenced brake arrangement arranged in accordance with the invention;

FIGURE 1A is a partial, cross-section view similar to FIGURE 1 but showing a modified brake shoe and lining arrangement;

FIGURE 2 is an isometric view of the brake drum shown in FIGURE 1;

FIGURE 3 is an isometric view of one of the brake shoes shown in FIGURE 1;

FIGURE 4 is a partial cross-sectional view similar to that shown in FIGURE 1 but showing another form of the sequenced brake system;

FIGURE 5 is an elevational view of still another sequenced brake system of the invention with parts broken away;

FIGURE 6 is a vertically sectioned view of the apparatus of FIGURE 5 and taken along reference line VI—VI thereof;

FIGURE 7 is a partial sectional view similar to FIGURE 6 but showing still another form of the sequenced brake system of the invention; and FIGURE 8 is a partial, cross-sectional view showing a brake system similar to that shown in FIGURE 1, but showing means for independently mounting and actuating the brake lining elements.

Referring now more particularly to FIGURES 1–3 of the drawings, the illustrative form of the invention shown therein includes in this example a wheel drum 10 for a vehicle such as an automobile and a pair of brake shoes 12. The brake shoes in this example are urged simultaneously against the brake drum 14 forming part of the wheel drum 10 by a conventional wheel cylinder 16 which in turn can be actuated by a master cylinder (not shown). In this arrangement, the brake drum 14 is composed of two parallel surfaces 18 and 20 of differing radial elevations so as to form a shoulder or step 22 therebetween. As better shown in FIGURE 2, the step 22 and the stepped drum surfaces 18, 20 co-extend peripherally about the brake drum 14.

Each of the brake shoes 12 are of complementary arcuate configuration for engagement of their brake linings 24 and 26 successively with the stepped brake and drum surfaces 18 and 20. In furtherance of this purpose, the brake lining portion 26 is somewhat thicker than the lining portion 24 so as to form a differential elevation or step 28 therebetween. The lining portions 24, 26 are separated to form a space 30 therebetween for cooling purposes. The brake linings 24, 26 can be riveted or preferably bonded to the brake shoe 12 in the conventional manner. The brake shoe 12 is provided with a strengthening rib 32 which desirably is aligned with the space 30 and with the brake drum step or shoulder 22.

Preferably, the differences in height or thickness between the brake lining segments 24, 26 is greater than the step or shoulder 22 of the brake drum 14 as better shown in FIGURE 1. Therefore, when the wheel cylinder is actuated to move the brake shoes 12 against the brake drum 14, the lining portion 26 will first engage its associated brake drum surface 20. However, the brake lining segments 26 are fabricated from a more resilient material, such as that sold under the trade name, "Mintex." In comparsion to the material from which the brake lining segments 24 are fabricated so that a further depression of the brake pedal or other device and associated hydraulic system or the like for applying pressure to the wheel cylinder 16 will compress the brake lining segments 26 to permit the other brake lining segments 24 to engage their associated brake drum surfaces 18 for increased braking action. Desirably, the brake lining segments 24 are fabricated from a less resilient, but faster wearing lining material such as that sold under the trade name "Ferado," so that the differences in height between the adjacent brake lining segments 24, 26 will be preserved.

As a result throughout the useful life of the brake lining, segments 24, 26, the thicker brake lining segments 26 will be employed alone for most light-braking situations. For emergency stops and other heavy braking applications, the thinner brake lining segments 24 will be forced into engagement with the brake drum 14 as well as the thicker segments 26.

As better shown in FIGURE 1A the brake lining segments 26' can be provided with substantially the same thickness as the brake lining segments 24' and the segments 24', 26' respectively mounted on stepped surface portions 34, 36 of the brake shoes 12'. In the arrangement of FIGURE 1A, the brake shoe step 38 desirably is aligned with the brake drum step 22'.

The brake arrangement of FIGURE 4 is similar to the preceding figures but differs therefrom in that the brake shoe 12' is provided with three brake lining segments 40, 42 and 44. Similarly, the brake drum 14' is provided with stepped surfaces 46, 48 and 50 for successive and respective engagement by the brake lining segments 40–44. In the latter arrangement of the invention the brake drum 14' is provided with two spaced and parallel steps 22'. If desired, the brake lining segments 40–44 can be provided of substantially the same thickness and mounted upon a stepped brake shoe (not shown) similar to that shown in FIGURE 1A but having a pair of spaced and parallel steps such as the steps 38.

In an exemplary arrangement of the sequenced brake system of FIGURES 1–3, the lining segments 24 can be about five mm. in thickness and the linings 26 about 7.3 mm. in thickness. The height or radial dimension of the step 22 can be about 2 mm. so that the outer surfaces of the segments 26 are 0.3 mm. closer to the associated surface 20 than the outer surfaces of the segments 24 relative to the surface 18. Accordingly, the segments 26 will engage the associated brake drum surface 20 and sufficient force will have to be applied by the wheel cylinder 16 in order elastically to deform the brake lining segments 26 before the brake lining segments 24 are in turn engaged by the associated brake drum surface 18. Thus, a sequenced engagement of the brake lining segments 24, 26 is obtained. Such sequential operation will be maintained irrespective of whether the brake pedal or other operating means is moved slowly or rapidly against the master cylinder (not shown) or other means for energizinz the brake system. Such means are well known and therefore are not illustrated in FIGURES 1–4.

A similar difference in radial dimension between the brake shoe step 28 and 22' can be established to provide sequential operation of the brake lining segments 24', 26. The aforementioned differences of 0.3 mm. is purely exemplary and it is contemplated that the actual difference in elevation will vary depending upon the difference in resiliencies of the respective brake lining segments. In the brake system of FIGURE 4, the difference in elevation or radial dimension between the brake linings 42, 44 or between the lining segments 40, 42 is greater than the radial dimension of the associated one of the steps 22' so that the brake lining segments 40–44 will engage their respective brake drum surface 46–50 successively in the order of their decreasing thickness.

It will be understood of course that the differences of elevations of the lining segments 40–44 can be less than the radial dimensions of the respective steps 22' (FIGURE 4) so that the lining segments 40–44 are applied in the order of their increasing thickness. In the latter arrangement the thinnest lining segment 40 will be fabricated from the most resilient material while the thickest lining segment 44 will be fabricated from the hardest material, rather than the reverse. In either case the intermediate lining segment will be of intermediate resiliency relative to the adjacent lining segments 40–44.

The braking systems of FIGURES 1 and 1A can be similarly arranged to engage the lining segments 24 or 24' before the segments 26 or 26'.

It will be understood of course, that the brake elements 24', 26' of FIGURE 8 (or the brake elements 40, 42, 44 of FIGURES 4) can be mounted on independently moveable supports 110, 112 as better shown in FIGURE 8 and actuated by separate hydraulic circuits including master cylinders 74' and 84' controlled by pedal 92'. It is also contemplated that the arrangement of FIGURE 8 can be adapted for use with disc braking surface means of either stepped or non-stepped configuration.

Referring now to FIGURES 5 and 6 of the drawings, a dual brake system is illustrated together with novel means for applying the dual brake elements in succession. The dual brake system 52 exemplarily includes a disc brake 54 and a drum brake 56 which engage drum and disc braking surface means, although other brake configurations can be employed, where desired. For example, two or more brake shoes can be disposed for movement toward and away from forceful engagement with either a disc surface or a drum surface. In the instant arrangement, the brake system 52 includes a combined brake disc and drum member 58 to which is bolted a tire rim 60 and tire (not shown) thereon in the conventional manner.

A pair of opposed brake shoes 62 each having a lining portion 64 are pivotally mounted on supporting shaft 66 secured to the bifurcate end of a suitable support such as arm 65 of wheel axle housing 67. As better shown in FIGURE 5, the shoes 62 are urged against opposite discoidal surfaces 68 for example by means of oppositely acting hydrulic cylinders 70. This action engages the brake lining segments 64 with opposite sides of the disc and drum member 58 to provide braking action. When the hydraulic cylinders are de-energized, the hinged brake shoes 62 are returned to their retracted positions by compressed spring 72. The hydraulic cylinder 70 in this example is coupled to a master cylinder 74 or other suitable energizing means.

The drum brake 56 in this example includes a single shoe 76 having brake lining 78 secured thereto. The shoe 76 and lining 78 are suitably contoured for surface engagement with the cylindrical surface 80 of the drum and disc meber 58. As better shown in FIGURE 5, the drum brake shoe 76 is urged against the cylindrical or drum surface 80 for example by means of hydraulic cylinder 82, which in turn is actuated by master cylinder 84. When the cylinder 82 is de-energized, tensioned coil spring 86 withdraws the drum brake shoe 76 to its inoperative position.

The aforedescribed drum and disc brakes 54 and 56 are applied sequentially, for example, by mounting their respective master cylinders 74, 84 so that the distal ends of their piston rods 88 and 90 are engaged at different positions of brake pedal 92 in its operating path. For example, when the brake pedal is depressed to the position denoted by chain outline 92a, the master cylinder 74 is energized, which in turn activates the disc brakes 54. This affords a light to medium braking action encountered under most driving conditions.

For heavy and emergency braking action further depression of the brake pedal to its chain outline position 92b energizes master cylinder 84 which in turn activates the drum brake 56. Further brake pedal depression increases the braking forces applied to the dual brake system, that is to say, to both the disc brakes 54 and the drum brake 56. However, even under emergency conditions the disc brake 54 is applied first with the drum brake being applied very shortly thereafter. With this sequential application of the disc and drum brakes, the vehicles wheels are very much less likely to lock and skid, resulting in loss of vehicle control.

It will be understood of course that additional drum and disc brakes can be employed with each vehicle wheel depending upon the amount of braking action required. It will also be understood that the hydraulic connections to the drum and disc brakes can be interchanged (not shown) so that the drum brake 56 is applied first, followed by application of the disc brakes 54, as the brake pedal 92 is depressed.

In FIGURE 7 of the drawings, still another arrangement of my novel sequencing brake system is illustrated. In the latter arrangement disc brakes 54' are provided for engagement with the disc and drum member 58' in much the same manner as described previously with FIGURES 5 and 6. Acting in conjunction with the disc brake 54', a stepped drum brake 94 is provided for sequentially operating with the stepped outer or cylindrical surface 80' of the drum and disc member. The surface 80' in this example is divided into three parallel surfaces 96, 98 and 100 of differing elevations for cooperation with brake lining segments 102, 104 and 106, of differing thickness, with the exception of the lining segments 102–106 being mounted on the inside of the brake shoe 94. The operation of the brake shoe 94 is similar to the brake shoe 12' of FIGURE 4. Accordingly, the respective elevations of the lining segments 102–106 relative to the brake drum steps 108 and the respective resiliencies of the lining segments differ as described previously in connection with FIGURES 1–4.

Hydraulic circuits are provided for the disc brake 54' and the drum brake 94, which circuits are similar to those described in connection with FIGURE 5 and likewise operated sequentially. With the brake system of FIGURE 7, in an emergency situation the disc brakes 54' are first applied, as in FIGURES 5 and 6, to initially slow the vehicle wheels without skidding. Very shortly, thereafter the drum brake 94 is applied resulting for example, in initial engagement of lining segment 102 with its associated drum surface 106 followed quickly, successively and immediately thereafter by engagements between lining segments 104 and 106 with drum surfaces 98 and 100 respectively. The successive application of brake lining segments 64', 102, 104, and 106 slows the vehicles wheels without skidding even under severe panic conditions.

Preliminary tests on a 1965 Corvair indicate a stopping distance of 30 meters from 60 m.p.h. with my novel brake system as compared to 83 meters with the factory brakes under the same conditions. In addition, use of my new brake eliminates swerve and the steep wave fronts of forward pitch forces.

From the foregoing, it will be apparent that novel and efficient forms of braking systems have been disclosed herein.

I claim:
1. A sequential frictional brake comprising a braking surface, a braking shoe mounted adjacent said braking surface and movable toward and away from said surface, said braking surface including a number of adjacent braking elements disposed at differing elevations, said brake shoe having a like number of brake lining segments arranged thereon for respectively engaging said braking surface portions, the engaging surfaces of said lining segments being disposed at differing elevations, the differential elevation of said braking surface portions being different than the differential elevations of said lining segments and means for moving said lining segments rapidly but sequentially into engagement with their respective braking portion surfaces during any given application of said brake system, said sequential moving means including means for moving said brake shoe with variable force against said braking surface, said lining segments being fabricated from materials of respectively differing resiliencies, and at least one of said lining segments being disposed closer to its respective braking surface portion than the remainder of said segments and said closer segments is fabricated from a correspondingly more resilient brake lining material with the remainder of said segments being fabricated from material of progressively less resilience so that the segments are successively engaged with their associated portions and are successively and elasticaly deformed to permit subsequent and successive engagement of the harder brake lining segments.

2. A sequential braking system for a vehicle wheel comprising a rotatably mounted disc and drum member, disc brake shoe means mounted for engaging the disc porportion of said member drum brake shoe means mounted for engaging the drum portion of said member, separate energizing circuits coupled to said disc brake means and drum brake means for urging said disc and said drum brake shoe against their respective braking surface, and means for operating said energizing circuits sequentially during any given application of said brake system, each of said energizing circuits being a hydraulic circuit including a master cylinder, and said operating means including a member movable through a prescribed operating path, said master cylinders being positioned so that actuating rods protruding respectively therefrom are engaged successively by said member at differing positions thereof along said path.

3. A sequential braking system comprising braking surface means, a number of braking elements mounted for relative movement therebetween toward and away from engagement with said surface means, means for sequentially moving said elements into forceful engagement with said surface means, means coupled to said sequential moving means for successively and predeterminally delaying, after the initial forceful engagement of one said elements for moving said elements into said forceful en said elements during any given application of said braking system, separate energizing circuits coupled to said brake elements for moving said elements into said forceful engagements, and means are provided for operating said energizing circuits sequentially, each of said energizing circuits being a hydraulic circuit including a master cylinder, and said operating means including a member movable through a prescribed operating path, said master cylinders being positioned so that actuating rods protruding respectively therefrom are engaged successively by said member at differing positions thereof along said path.

References Cited

UNITED STATES PATENTS

| 2,062,167 | 11/1936 | Dieter. | |
| 2,682,319 | 6/1954 | Bennett | 188—79 |
| 2,790,517 | 4/1957 | Bennett | 188—79 |
| 3,114,581 | 12/1963 | Tuszynski | 303—2 |
| 3,051,271 | 8/1962 | Spannagel et al. | |

FOREIGN PATENTS

| 200,742 | 7/1923 | Great Britain. |
| 554,408 | 7/1943 | Great Britain. |

DUANE A. REGER, Primary Examiner

U.S. Cl. X.R.

188—79, 106, 152, 250; 303—2

UNITED STATES PATENT OFFICE
CERTIFICATE OF CORRECTION

Patent No. 3,487,894  January 6, 1970

Elemer Szigeti

It is certified that error appears in the above identified patent and that said Letters Patent are hereby corrected as shown below:

Column 1, line 37, "ot" should read -- to --. Column 7, line 28, "elasticaly" should read -- elastically --. Column 8, lines 13 and 14, "for moving said elements into said forceful en-said elements" and insert -- the forceful engagement of the remainder of said elements --.

Signed and sealed this 10th day of November 1970.

(SEAL)
Attest:

Edward M. Fletcher, Jr.
Attesting Officer

WILLIAM E. SCHUYLER, JR.
Commissioner of Patents